PRENTISS & PARSONS.
Treating Corn for Malting.
No. 63,174. Patented March 26, 1867.
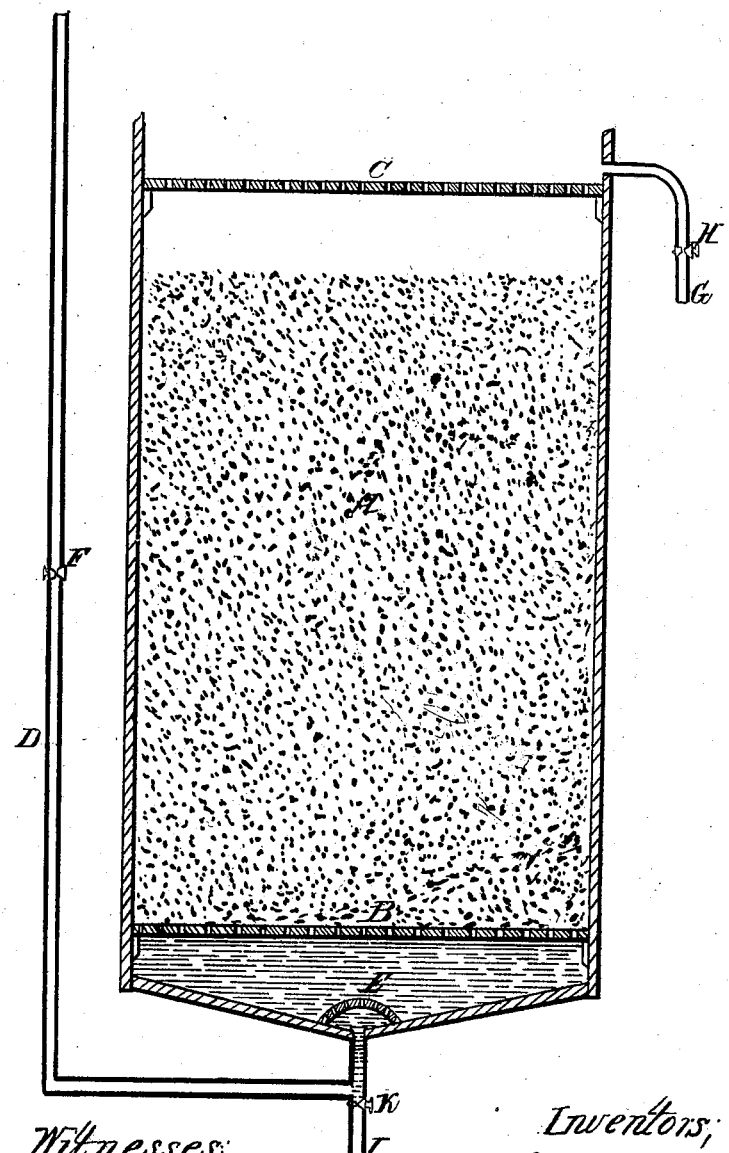

United States Patent Office

ELIJAH FREEMAN PRENTISS, OF PHILADELPHIA, PENNSYLVANIA, AND CHARLES CHAUNCY PARSONS, OF BOSTON, MASSACHUSETTS.

Letters Patent No. 63,174, dated March 26, 1867; antedated March 15, 1867.

IMPROVED PROCESS FOR TREATING INDIAN CORN.

*The Schedule referred to in these Letters Patent and making part of the same.*

TO ALL WHOM IT MAY CONCERN:

Be it known that we, ELIJAH FREEMAN PRENTISS, of Philadelphia, in the State of Pennsylvania, and CHARLES CHAUNCY PARSONS, of Boston, in the State of Massachusetts, have invented a certain new and improved Process for Treating Indian Corn; and we do hereby declare that the following is a full, clear, and exact description of the same, reference being had to the annexed drawings, (representing one form of the apparatus by which we carry the said process into operation,) and to the letters of reference marked thereon.

The object of our invention is to so treat the corn that we obtain from it a wash suitable for the manufacture of alcoholic spirits, and also obtain the residual grains of a greater commercial value than the residue produced by any method of distillation hitherto known.

In the drawings, A is a vessel about ten feet high and five feet in diameter. B is a perforated false bottom, the perforations, of about one-eighth inch in capacity, being placed more closely together toward the circumference than toward the centre in order to secure a more equal distribution of the liquid introduced through the pipe D. C is a perforated cover resting on a ledge about one foot below the top of the vessel, and made so that it can be easily removed. D is a pipe terminating in a rose-head, E, at the bottom of the vessel A, and is also furnished with a stop-cock, F, for regulating the supply of water. G is a pipe opening into the vessel A above the cover C, and provided with a stop-cock, H. I is a pipe for drawing off the contents of the vessel A, when desired. K is a stop-cock. The method of carrying our improved process into effect is as follows: We first pass the corn between rollers adjusted so that the corn shall be bruised or crushed but not ground into meal. In preparing for a mash we place the usual proportion of malt on the perforated bottom B. We next put the crushed corn in the vessel A, filling said vessel within about a foot of the cover C, this space being left to allow for the swelling of the grain. We then introduce water, heated to a temperature of 165° Fahrenheit, slowly through the pipe D into the vessel A. This water percolates up through the grain until the latter is saturated. The water is then shut off and the contents of the vessel rest for about thirty minutes. We then admit water slowly at a temperature of 170° Fahrenheit through the pipe D, filling the vessel two or three inches above the level of the grain. The cock F is then closed and the contents of the vessel A are allowed to rest for three hours. The wash is then strained off through the pipe I. The cock K is then closed and the cock F partially opened, and water at a temperature of about 180° Fahrenheit is admitted very slowly. The water filters upward through the grains and flows off through the pipe G, carrying with it as much of the soluble matters as may be desired. The inward flow of water is permitted as long as desired, increasing to 195° Fahrenheit at the end of the operation. We prefer to stop off the water when there shall have been admitted from the commencement of the operation about twenty gallons of water to each bushel of grain treated. The operation of mashing is finished by drawing off through pipe I all the liquid that will run off. Wash running off too weak for fermentation may be evaporated down to a proper strength or be used in treating the next wash. The residual grains, in the state in which they come from the vessel A, will be found to be a very valuable food for cattle by reason of the heating qualities of the corn having been removed, or, if dried (by steam or in any other convenient way) and ground into meal, or kept unground, may be preserved for any length of time. The wash produced by our process will be found to yield spirits superior to those produced by the ordinary process of mashing, on account of the grains not having been passed through the still.

We do not wish to confine ourselves to the exact temperatures, times, or form of apparatus specified. Those we have described produce good results. Practical distillers will easily understand how to vary them according to the quantity and quality of the grain treated. The water may be brought into the vessel A at the top instead of the bottom, and in that case the wash is to be drawn off from the bottom of the vessel A.

Having thus described our invention, we claim, and desire to secure by Letters Patent—

The process of treating Indian corn in the manner and for the purposes substantially as described.

E. FREEMAN PRENTISS,
C. C. PARSONS.

Witnesses:
J. E. SHAW,
JOHN LATHROP.